Oct. 26, 1954 H. K. VAN JEPMOND 2,692,908
COLOR TELEVISION RECEIVER
Filed June 25, 1952 2 Sheets-Sheet 1

INVENTOR:
HOWARD K. VAN JEPMOND
BY Francis W. Crotty
HIS ATTORNEY.

Oct. 26, 1954 H. K. VAN JEPMOND 2,692,908

COLOR TELEVISION RECEIVER

Filed June 25, 1952 2 Sheets-Sheet 2

INVENTOR:
HOWARD K. VAN JEPMOND
BY Francis W. Crotty
HIS ATTORNEY.

Patented Oct. 26, 1954

2,692,908

UNITED STATES PATENT OFFICE 2,692,908

COLOR TELEVISION RECEIVER

Howard K. Van Jepmond, Chicago, Ill., assignor to Zenith Radio Corporation, a corporation of Illinois Application June 25, 1952, Serial No. 295,515

3 Claims. (Cl. 178—5.4)

This invention relates to a new and improved television receiver and particularly to a receiver for utilizing a composite signal containing periodic blanking intervals which include two different types of synchronizing information. The invention is especially valuable when employed in a receiver for color television signals, and is described in that connection.

During the past several years many methods and arrangements have been proposed for the transmission and reception of color television information, and a number of these proposals have been incorporated in a single television system under the auspices of the National Television System Committee. The N. T. S. C. system, which has been widely publicized and described in numerous technical publications, contemplates the resolution of a color image into three components including a brightness, or monochrome, signal and two separate color signals, the latter being substantially devoid of brightness information. The monochrome signal is transmitted over a broadcast range of frequencies in a manner generally corresponding to that employed for standard commercial black and white television. The color-control signals, on the other hand, are employed to modulate a color sub-carrier having a frequency equal to an odd harmonic of one-half the line-scanning frequency, and the resultant signal is interlaced with the monochrome signal for simultaneous transmission. The present proposed standard for this color sub-carrier frequency is 3.898125 megacycles.

In order to utilize the N. T. S. C. signal at a receiver, a reference signal comprising a continuous oscillation wave of stable phase is required. This color reference signal enables the receiver to separate the color-control information from the transmitted composite signal. At present, it is proposed to transmit a color synchronizing signal as a "burst" of oscillations occurring during each horizontal blanking interval and immediately following a horizontal scansion-synchronizing pulse of the same general type as that currently utilized in monochrome transmission. This color burst is employed to regulate the phase and frequency of the locally generated color reference signal to permit intelligible reproduction of the transmitted color information.

The positioning of the color burst on the same general level with the horizontal scansion-synchronizing pulse gives rise to considerable difficulty in the construction of an adequate scanning-deflection system. The usual method of separation of the scansion-synchronizing pulses comprises filtering out the color burst, which results in a wave-form including the scansion-synchronizing pulse followed by a pedestal representing the average value of the color burst. This procedure makes it necessary for the deflection system to differentiate between the scansion pulse and the color pedestal; otherwise, the scanning system may operate erratically and unpredictably. A scansion-synchronizing system which is capable of operating above the level of the color-burst pedestal requires manufacture to exacting standards, and, in addition, is undesirably expensive when considered in relation to the economic requirements of commercial receivers.

It is an object of this invention, therefore, to provide a new and improved television receiver which is capable of differentiating between transmitted scansion-synchronizing pulses and other synchronizing information when both are included in the same amplitude portion of a composite signal.

It is a further object of this invention to provide a television receiver, capable of discriminating between scansion-synchronizing pulses and color-synchronizing information, which is economical to manufacture and simple and expedient to assemble.

It is a corollary object of the invention to provide a color television receiver including a synchronizing-signal analyzing network which provides positive control for preventing unpredictable and erratic operation.

The television receiver of the invention may be employed to reproduce an image in response to a composite signal including periodically recurring blanking intervals, each of the intervals comprising a scansion-synchronizing pulse and a burst of a color sub-carrier frequency signal. The scansion-synchronizing pulses and color bursts are of substantially equal peak amplitudes. The receiver includes a frequency-selective network having a substantially greater response at the color sub-carrier frequency than at the repetition frequency of the scansion-synchronizing pulses, and also includes means to apply the composite signal to that network in order to develop a first modified composite signal in which the peak amplitude of the color bursts is substantially greater than that of the scansion-synchronizing pulses. A peak clipper is coupled to the network, from which it receives the first modified composite signal; the clipper develops a second modified composite signal in which the average amplitude of the color bursts is materially reduced with respect to the peak amplitude of the scansion-synchronizing pulses. This second modified signal is applied to a scansion-synchronizing pulse separator wherein the scansion pulses are isolated from the signal.

The features of the present invention which are believed to be novel are set forth with particularity in the appended claims. The organization and manner of operation of the invention, together with further objects and advantages thereof, may best be understood by reference to the following description taken in connection with the accompanying drawings, in which;

Figure 1 is a graphical representation of a portion of the currently accepted N. T. S. C. synchronizing signal;

Figure 1:
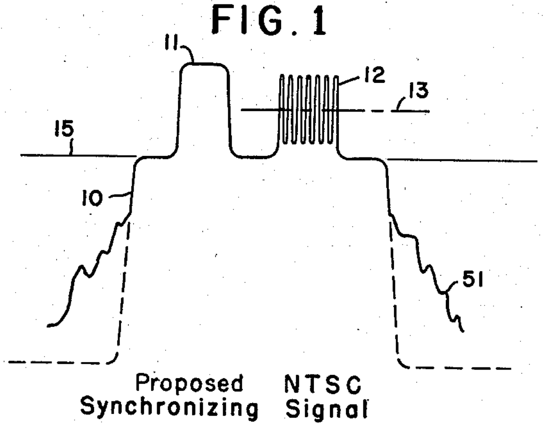

The wave-form of Figure 1, illustrating the present proposed standard horizontal blanking interval for the N. T. S. C. color television system, comprises a blanking pedestal 10 which extends to the "black level" 15 of the composite video signal. Two separate synchronizing signals are superimposed upon pedestal 10 above level 15, the first of these being a horizontal scansion-synchronizing pulse 11 and the other being a burst of a color sub-carrier frequency signal 12. The currently accepted standard for the frequency of color burst 12 is 3.898125 mc., which is the 495th harmonic of one-half the standard line-scanning frequency of 15,750 cycles per second. In accordance with present practice, the color burst is approximately centered on the "back porch" of the blanking pedestal; the exact location of the signal has not as yet been permanently established and it may ultimately be located in either greater or lesser proximity to scansion pulse 11. Current standards require that the amplitude of color burst 12 above blanking pedestal 10 fall within the range from 85 to 100 per cent of the amplitude of scansion-synchronizing pulse 11, so that the peak amplitudes of these two synchronizing signals are substantially equal. It is apparent that the average value of the amplitude of color burst 12 is, therefore, essentially equal to one-half the amplitude of scansion pulse 11; and corresponds approximately to the dash-dot line 13.

As noted in the foregoing discussion, it may be difficult for the scansion deflection system of a television receiver to differentiate between these two synchronizing signals. Most synchronizing signal separators are amplitude sensitive clippers or slicers which have a clipping level closely corresponding to black level 15. It is apparent that construction of an effective clipper is made far more difficult when the amplitude range of the slicer is reduced by one-half as compared with the range available for monochrome systems. The problem can be solved by a gating arrangement, but this is at best an expensive and complex expedient.

Figure 2:
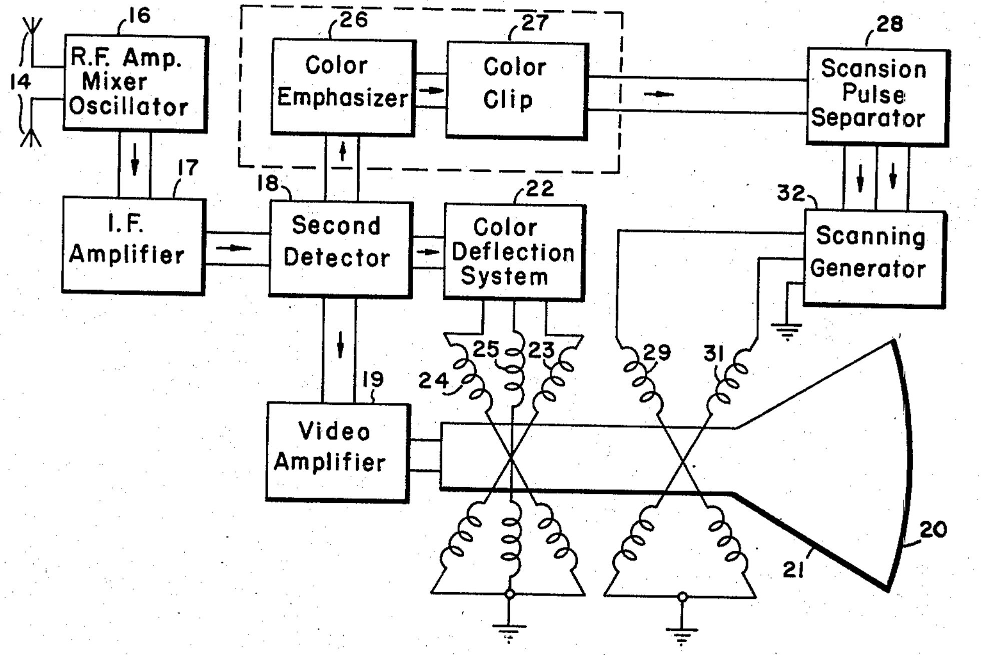
Figure 2 is a schematic diagram of a television receiver according to the invention.

The color television receiver illustrated schematically in Figure 2 includes means for obviating any undesirable effects which the color burst might have on operation of the line-frequency scanning system. The receiver comprises an antenna 14, a radio-frequency amplifier and first detector 16, and an intermediate-frequency amplifier 17 connected in turn to a second detector 18. Detector 18 includes a plurality of sets of output terminals, one of which is connected to a video amplifier 19; amplifier 19 is coupled in turn to the beam-generating electrode system of an image-reproducing device 21, which in this instance comprises a single-gun cathode-ray tube having a tri-color image screen 20. Another of the sets of output terminals of second detector 18 is coupled to a color-deflection system 22, to which is connected three color-deflection coils 23, 24 and 25 associated with image-reproducing device 21.

The above-enumerated receiver components are generally well-known in the art, and a detailed description of their operation is therefore unnecessary. Briefly, a composite color television signal including horizontal and vertical scansion-synchronizing intervals is received at antenna 14. This signal is amplified and detected in amplifier-detector 16 and further amplified in intermediate-frequency amplifier 17, whence the composite signal is applied to second detector 18. In detector 18, the signal is reduced to a composite video signal including brightness and color information as well as scansion-synchronizing information, but free of the transmission carrier frequency. The output of detector 18 is applied to video amplifier 19, wherein the brightness information is amplified; the output of amplifier 19 is employed to control the electron-beam generating system of cathode-ray tube 21 and thus determines the beam intensity of the reproduced image in accordance with the picture content. The output of detector 18 is also applied to a color-deflection system, in which the color-control signals are separated from the monochrome information and are applied to coils 23—25 to control the angular deflection of the electron beam of device 21 and thus regulate the color content of the reproduced image. A single-tube single-gun system has been illustrated solely for convenience in presentation; it should be understood that this part of the receiver may be varied to include three-gun single-tube and three-tube arrangements, for example, without departing from the teaching of the invention.

The receiver also includes a scanning control system coupled to second detector 18. This system comprises a color pre-emphasizer 26 connected to the detector, the pre-emphasizer in turn being coupled to a peak clipper 27. A scansion-synchronizing pulse separator 28 is coupled to the output terminals of clipper 27 and to the input terminals of a scanning generator 32, the output of the scanning generator being connected to a pair of scanning-deflection coils 29 and 31 positioned to control the vertical and horizontal scansion of the electron beam of image-reproducer 21. Coils 29 and 31, as well as color-deflection coils 23, 24, may be replaced by suitable electrostatic-deflection electrodes if this method of beam control is preferred.

When the receiver is placed in operation, the output signal of detector 18 is modified by pre-emphasizer 26 and fed to clipper 27, wherein it is further modified, as more completely described hereinafter in connection with Figures 3-5. The doubly modified composite signal appearing at the output of clipper 27 is applied to separator 28, in which the horizontal and vertical scansion-synchronizing pulses are separated from the composite signal and from each other. These synchronizing pulses are then individually applied to scanning generator 32, wherein they are employed to control the generation of suitable scanning signals which are applied to deflection coils 29 and 31. Separator 28 and generator system 32 may be of any of the well-known types currently in use for monochrome television reception.

Figure 3:
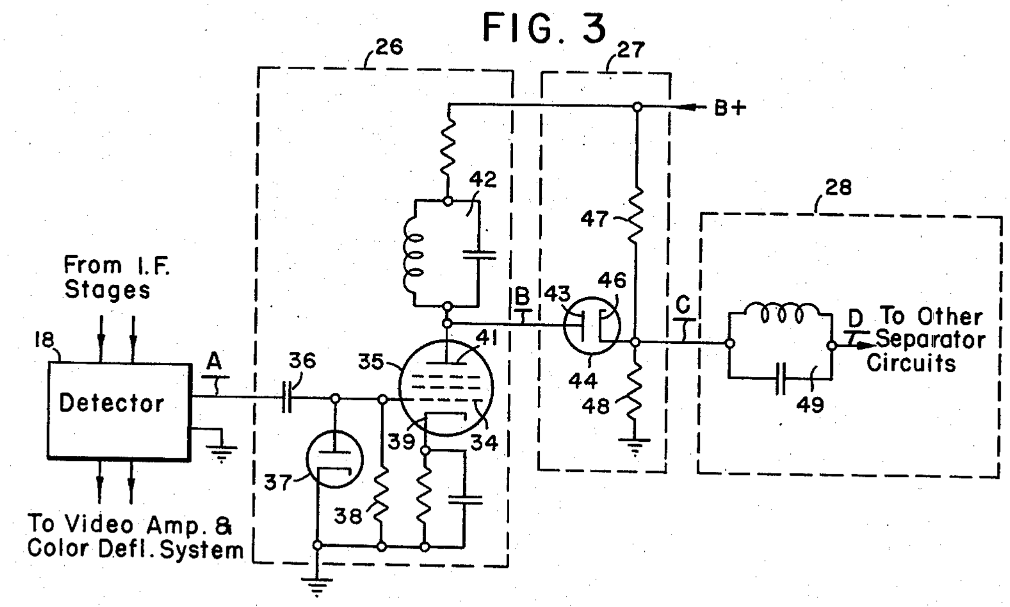
Figure 3 is a detailed schematic diagram of a portion of the receiver shown in Figure 2.

The circuit diagram of Figure 3 illustrates one embodiment of the scanning-control system of the invention. In that embodiment, one output terminal of second detector 18 is coupled to the control grid 34 of a pentode amplifier tube 35 through a capacitor 36. A clamping diode 37 and a grid resistor 38 are connected in parallel between control electrode 34 and ground, and the cathode 39 of amplifier 35 is also coupled to ground through a resistance-capacitance biasing circuit. The anode 41 of tube 35 is connected to a source of positive unidirectional operating potential B+ through a parallel-resonant inductance-capacitance circuit 42 tuned to the color sub-carrier frequency of 3.898+ mc. Anode 41 is also coupled to the anode 43 of a diode 44, with the cathode 46 of the diode connected to potential source B+ through a resistor 47 and to ground through a resistor 48. Cathode 46 is also coupled to scansion pulse separator 28. A parallel-tuned inductance-capacitance circuit 49 may be included in the input separator 28; circuit 49 is adjusted to resonate at the color subcarrier frequency of 3.898+ megacycles.

Figure 4A:
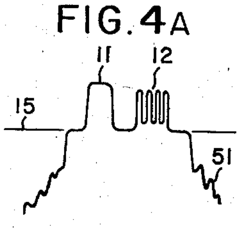
Figures 4A through 4D are fragmentary graphical representations of signal wave-forms appearing at various points in the circuit of Figure 3.
Figure 4B:
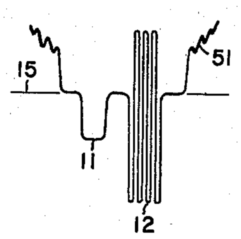

Figures 4A through 4D have been included to indicate the approximate wave-forms of the composite signal at various points in the circuit of Figure 3, and are referred to from time to time in the ensuing description of the operation of that circuit. When the receiver is placed in operation, the output of detector 18 appearing at point A in Figure 3 is represented by the waveform of Figure 4A, in which the peak amplitudes of scansion-synchronizing pulse 11 and color burst 12 are substantially equal. This wave form corresponds to that of Figure 1, with video information included as at 51. The signal of Figure 4A is applied to grid 34 of amplifier tube 35, the D. C. level of the signal being maintained constant by the action of clamper diode 37. The entire signal is amplified to a certain extent by device 35, but color burst 12 is amplified considerably more than scansion-synchronizing pulse 11, due to the presence of tuned circuit 42 in the output circuit of the amplifier. Thus, the output of pre-emphasizer 26 appearing at point B assumes the configuration shown in Figure 4B, in which the color burst is substantially greater in peak amplitude than the scansion-synchronizing pulse.

Figure 4C:
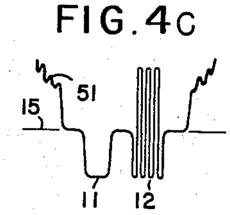
Figure 4D:
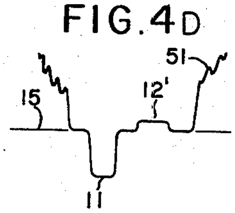

This first modified composite signal is applied to anode 43 of diode 44. Diode 44, in conjunction with resistors 47 and 48, functions as a conventional peak clipper and materially reduces the amplitude of color burst 12, preferably to a point where it is approximately equal to the peak amplitude of pulse 11. The clipping level is determined by the relative values of resistors 47, 48. This action results in the production of a second modified composite signal appearing at the point C in the output of clipper 27, the general configuration of this second modified composite signal being illustrated in Figure 4C. As is apparent from Figure 4C, the average amplitude of color burst 12 at the output of peak clipper 27 is materially reduced with respect to the peak amplitude of pulse 11, and may even fall below black level 15. The signal of Figure 4C is applied to scansion-synchronizing pulse separator 28 through tuned circuit 49, the wave-form at the output of the tuned circuit being generally illustrated in Figure 4D. This signal, which appears at point D in Figure 3, no longer contains the high frequency color sub-carrier components, but retains only a pulse 12′ representing the average value of the modified color burst 12 and having an amplitude sufficiently lower than the peak amplitude of pulse 11 to preclude any possibility of adversely affecting the operation of subsequent stages of the scanning system. The reduction of the modified form of color burst 12 appearing in Figure 4C to the color pedestal 12′ of Figure 4D is due to the high series impedance of parallel resonant circuit 49 at the color sub-carrier frequency and the relatively low series impedance of that circuit at the scansion-synchronizing pulse frequency. In succeeding stages of separator 28, the scansion-synchronizing pulses 11 are separated from the composite signal by a clipper or slicer having a clipping level between black level 15 and the peak amplitude of pulse 11.

Portions of video information 51 which are in the same frequency range as color burst 12 may also be distorted as by the operation of circuits 26 and 27 and filter 49 in the same manner as the color burst. However, the net effect on these components of video information 51 is substantially the same as the effect on color burst 12, and therefore does not adversely affect the operation of the scansion-synchronizing system. The apparatus disclosed in Figure 3 and the foregoing description are based upon the assumption that the composite signal developed in detector 18 comprises a series of positive variations with respect to a reference potential. For those cases where the output of detector 18 comprises a variable signal of negative polarity, the circuits of pre-emphasizer 26 and clipper 27 must be changed in order to conform to this type of signal; however, such changes will be obvious to those skilled in the art and therefore need not be described herein.

Figure 5:
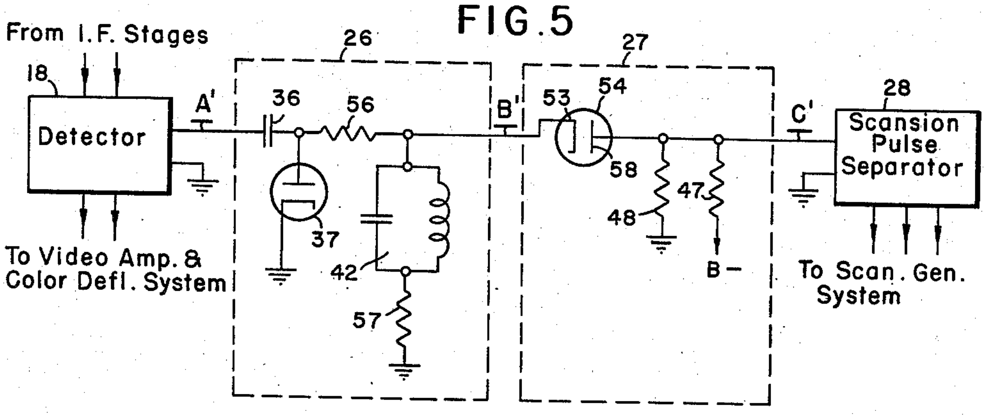
Figure 5 is a detailed schematic view of an alternative construction for that portion of the receiver illustrated in Figure 3.

The circuit illustrated in Figure 5 comprises a modified construction for pre-emphasizer 26 and clipper 27 of Figure 2. In this embodiment of the invention, the output of detector 18 is coupled to the cathode 53 of a diode 54 through capacitor 36 and a series resistor 56. Clamper diode 37 is coupled to the junction of resistor 56 and capacitor 36, whereas tuned circuit 42 is interposed between resistor 56 and a resistor 57, resistor 57 being connected to ground. The anode 58 of diode 54 is coupled to separator 28 and is also connected to ground and to a negative potential source B− through resistors 48 and 47 respectively.

The signal applied to pre-emphasizer 26 corresponds to that of Figure 4A, this wave-form appearing at point A′ in the circuit. The presence of resonant circuit 42 in the output circuit of pre-emphasizer 26 serves to accentuate the amplitude of color burst 12 with respect to pulse 11, and as a result the wave-form appearing at point B′ corresponds to that of Figure 4B, with the exception that the wave-form in this case is not inverted. Thus the network shown for pre-emphasizer 26 in Figure 5 performs the same basic function as that illustrated in Figure 3, except that no amplification is achieved. Where amplification is unnecessary or undesirable at this stage of the scanning-deflection system, the network of Figure 5 is preferable for obvious reasons of economy. Diode 54 and its associated resistors 47 and 48 reduce the amplitude of the color burst in a manner exactly analogous to the operation of diode 44 of Figure 3, the anode and cathode connections being reversed because of the inverted polarity of the applied signal. As a result, the signal appearing at point C′ in the output of clipper 27 corresponds to that of Figure 4C except for the difference in polarity. This signal is, as before, applied to separator 28, which extracts the scansion-synchronizing pulses for application to the scanning generator system.

While particular embodiments of the present invention have been shown and described, it is apparent that changes and modifications may be made without departing from the invention in its broader aspects, and, therefore, the aim in the appended claims is to cover all such changes and modifications as fall within the true spirit and scope of the invention.

I claim:

1. A television receiver for utilizing a composite signal including periodically recurring blanking intervals each of which comprises a scansion-synchronizing pulse and a burst of a color-subcarrier frequency signal having substantially equal amplitudes, said receiver comprising: a frequency selective network, including a resonant circuit having a resonance frequency substantially equal to said color-subcarrier frequency, having a substantially greater response at said color-subcarrier frequency than at the repetition frequency of said scansion-synchronizing pulses; means for applying said composite signal to said network to develop a first modified composite signal in which the peak amplitude of said color bursts is substantially greater than that of said scansion-synchronizing pulses; a peak clipper coupled to said network for receiving said first modified composite signal and developing therefrom a second modified composite signal in which the average amplitude of said color bursts is materially reduced with respect to the peak amplitude of said scansion-synchronizing pulses; and a scansion-synchronizing pulse separator coupled to said peak clipper for receiving said second modified composite signal and separating said scansion-synchronizing pulses therefrom.

2. A television receiver for utilizing a composite signal including periodically recurring blanking intervals each of which comprises a scansion-synchronizing pulse and a burst of a color-subcarrier frequency signal having substantially equal amplitudes, said receiver comprising: a frequency selective network, including a resonant circuit having a resonance frequency substantially equal to said color-subcarrier frequency, having a substantially greater response at said color-subcarrier frequency than at the repetition frequency of said scansion-synchronizing pulses; means for applying said composite signal to said network to develop a first modified composite signal in which the peak amplitude of said color bursts is substantially greater than that of said scansion-synchronizing pulses; a peak clipper coupled to said network for receiving said first modified composite signal and developing therefrom a second modified composite signal in which the average amplitude of said color bursts is materially reduced with respect to the peak amplitude of said scansion-synchronizing pulses; a filter circuit coupled to said peak clipper for receiving said second modified composite signal and developing therefrom a third modified composite signal in which the peak amplitude of said color bursts is reduced to their average amplitude; and a scansion-synchronizing pulse separator coupled to said filter circuit for receiving said third modified composite signal and separating said scansion-synchronizing pulses therefrom.

3. A television receiver for utilizing a composite signal including periodically recurring blanking intervals each of which comprises a scansion-synchronizing pulse and a burst of a color-subcarrier frequency signal having substantially equal amplitudes, said receiver comprising: a frequency-selective amplifier, including a resonant circuit having a resonance frequency substantially equal to said color-subcarrier frequency, having a substantially greater response at said color-subcarrier frequency than at the repetition frequency of said scansion-synchronizing pulses; means for applying said composite signal to said amplifier to develop a first modified composite signal in which the peak amplitude of said color bursts is substantially increased with respect to that of said scansion-synchronizing pulses; a peak clipper coupled to said amplifier for receiving said first modified composite signal and developing therefrom a second modified composite signal in which the average amplitude of said color bursts is materially reduced with respect to the peak amplitude of said scansion-synchronizing pulses; and a scansion-synchronizing pulse separator coupled to said peak clipper for receiving said second modified composite signal and separating said scansion-synchronizing pulses therefrom.

References Cited in the file of this patent

UNITED STATES PATENTS

| Number | Name | Date |
|---|---|---|
| 2,539,440 | Labin | Jan. 30, 1951 |